Aug. 4, 1936.  C. T. PFLUEGER  2,050,194

ANGLER'S IMPLEMENT

Filed Nov. 2, 1932

INVENTOR
CHARLES T. PFLUEGER

BY Ely & Barrow

ATTORNEYS

Patented Aug. 4, 1936

2,050,194

UNITED STATES PATENT OFFICE 2,050,194

ANGLER'S IMPLEMENT

Charles T. Pflueger, Akron, Ohio, assignor to The Enterprise Manufacturing Company, Akron, Ohio, a corporation of Ohio Application November 2, 1932, Serial No. 640,813

1 Claim. (Cl. 81—1)

This invention relates to anglers' implements, and more especially it relates to improved piercing tools or stilettos for which the fisherman finds various uses, such as punching holes in pork rind bait, untying knots in fish lines, etc. For convenience the improved tool may be constructed as an integral part of another tool frequently used by fishermen, it being shown herein in association with a hook disgorger.

The chief object of the invention is to provide an improved piercing tool for anglers including a sheath for said tool. More specifically the invention aims to protect the angler from the point of the tool, and to protect the point of the tool from damage. Other objects will be manifest.

In the drawing in which the best known or preferred form of the invention is shown:

The device consists of a bar or main stem 1, one end of which is offset as shown at 2 and is formed with an operative extension or head 3 which lies substantially parallel to the stem 1 but offset therefrom for the purpose to be noted. The head 3 is flattened and is provided with a claw or V-shaped notch 4.

Figure 1:
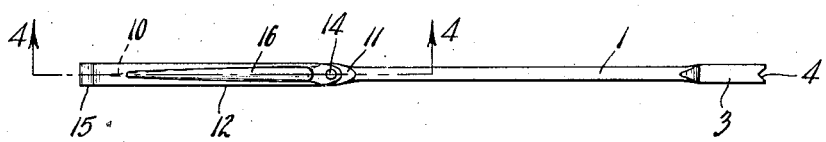
Figure 1 is a plan view of the improved implement.
Figure 2:
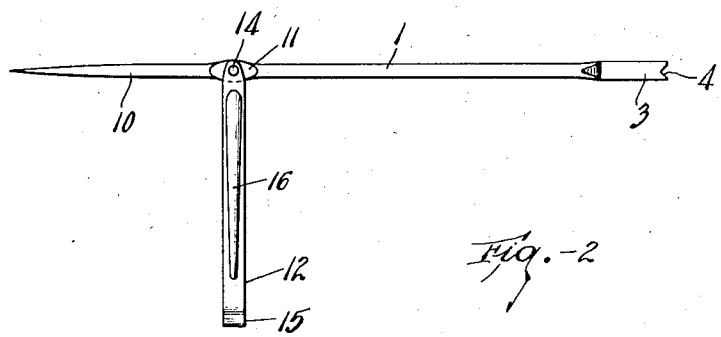
Figure 2 is a side view thereof with the stiletto guard moved to position to expose the stiletto.
Figure 3:
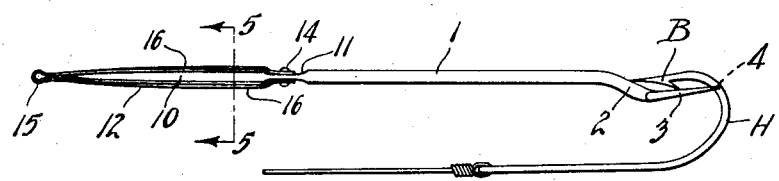
Figure 3 is a view showing the manner in which the implement is used in disgorging the hook.
Figure 4:
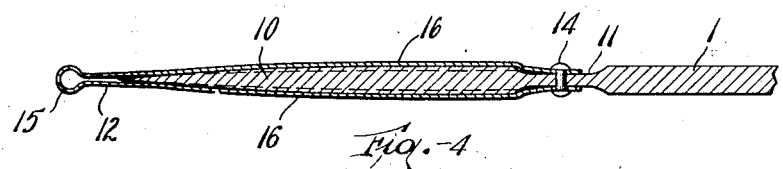
Figure 4 is a section through the stiletto end of the disgorger on the line 4—4 of Figure 1.
Figure 5:
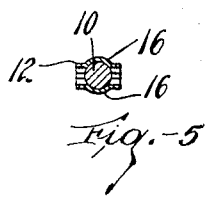
Figure 5 is a section on the line 5—5 of Figure 3.

In the operation of the device, the fisherman inserts the end of the disgorger in the mouth of the fish until the V-shaped notch engages the curved portion of the hook H in the rear of the barb B. By pressing down on the stem, he forces the hook down into the fish releasing the barb from its engagement with the flesh. The disgorger is then moved until it occupies the position shown in Figure 3, the notch engaging the hook directly behind the barb and the point of the hook lying in the pocket or re-entrant provided by the offset 2 so that the point and barb of the hook are effectively guarded. It is then easy to remove the hook and disgorger without danger of again catching the fish on the hook.

The opposite end of the bar or handle 1 is formed with the stiletto 10 and at a point some distance in the rear of the point, the handle is flattened, as at 11, at which point the stiletto guard 12 is pivoted. This is in the form of a sheath folded at its midway point, the end of the sheath being mounted on a pivot 14 at the point 11. The body of the sheath is tapered outwardly to fit the taper of the stiletto and is formed with a curved or bowed end defining an eyelet 15 which gives a certain springiness to the sheath, and through which a cord or chain may be passed to permit the device to be attached to the belt of the user. Along the sheath the metal is stamped or pressed outwardly to form channels or grooves 16 on opposite sides of the sheath which fit over and receive the stiletto. As the sheath 12 is swung into alignment, the sheath will give sufficiently to permit it to seat over the stiletto where it is held against accidental movement. The stiletto is thus covered while the disgorger is being used for the purposes set forth. In using the fish hook disgorger, the point of the stiletto is covered so that the implement may be pressed inwardly in disgorging the hook without danger of injury to the palm. The stiletto is of general utility and may be used by a fisherman for various purposes such as cleaning out the eyes of artificial baitflies, for punching holes in pork rind, or for untying knots in the fish line.

The form of the device may be varied within the scope of the invention which is not limited to the exact details herein shown and described.

What is claimed is:

An angler's implement comprising a bar having a pointed end portion, and a spring metal sheath pivotally mounted upon the bar and movable angularly over said pointed end portion, said sheath consisting of a single strip of metal folded double, the adjacent margins of the strip defining a longitudinal slot of such width that the pointed end portion of the implement passes therethrough by springing of the structure, the opposite walls of said structure being formed with longitudinally extending grooves in which the pointed end portion of the bar seats when the sheath is mounted thereon.

CHARLES T. PFLUEGER.